United States Patent [19]

Dao et al.

[11] Patent Number: 4,955,977
[45] Date of Patent: Sep. 11, 1990

[54] NONLINEAR OPTICAL ARTICLE WITH IMPROVED BUFFER LAYER

[75] Inventors: Phat T. Dao; Michael Scozzafava; Jay S. Schildkraut; Christopher B. Rider, all of Rochester, N.Y.

[73] Assignee: Eastman Kodak Company, Rochester, N.Y.

[21] Appl. No.: 419,819

[22] Filed: Oct. 11, 1989

[51] Int. Cl.$^5$ .......................... G02B 6/00; H03F 7/00; B32B 9/04; F21V 9/14
[52] U.S. Cl. ............................ 350/96.34; 350/96.12; 350/96.14; 350/311; 350/374; 350/377; 307/425; 307/427; 307/430; 428/411.1; 252/582; 252/585
[58] Field of Search ............... 350/96.10, 96.11, 96.12, 350/96.13, 96.14, 96.15, 96.30, 96.34, 96.33, 311, 370, 374, 377; 428/411.1; 427/162, 164, 165; 430/159, 170, 270, 290, 321, 900, 921; 307/425, 427, 430; 264/1.1, 1.3, 1.7; 252/582, 585

[56] References Cited

U.S. PATENT DOCUMENTS

| | | | |
|---|---|---|---|
| 2,441,668 | 5/1948 | Mathers et al. | 23/88 |
| 3,176,575 | 4/1965 | Socha | 88/1 |
| 3,883,214 | 3/1975 | Hoffman | 350/1 |
| 4,431,263 | 2/1984 | Garito | 350/96.34 |
| 4,536,450 | 8/1985 | Garito | 428/411.1 |
| 4,659,177 | 4/1987 | Choe et al. | 350/96.34 |
| 4,720,355 | 1/1988 | DeMartino | 252/582 |
| 4,775,215 | 10/1988 | Teng et al. | 350/96.34 |
| 4,779,961 | 10/1988 | De Martino | 350/350 R |
| 4,792,208 | 12/1988 | Ulman et al. | 350/96.34 |
| 4,807,968 | 2/1989 | Leslie | 350/311 |
| 4,855,078 | 8/1989 | Leslie | 252/582 |
| 4,859,876 | 8/1989 | Dirk et al. | 307/425 |
| 4,865,406 | 9/1989 | Khanarian et al. | 350/96.12 |
| 4,886,339 | 12/1989 | Scozzafava et al. | 350/96.34 |

OTHER PUBLICATIONS

D. J. Williams, "Organic Polymeric and Non-Polymeric Materials with Large Optical Nonlinearities", *Angew. Chem.* Int. Ed. Engl., 23, (1984), 690–703.

Zyss, "Nonlinear Organic Materials for Integrated Optics", *Journal of Molecular Electronics*, vol. 1, pp. 25–45, 1985.

J. I. Thackera, G. F. Lipscomb, M. A. Stiller, A. J. Ticknor, and R. Lytel, "Poled Electro-Optic Waveguide Formation in Thin-Film Organic Media", Appl. Phys. Lett., 52 (13), Mar. 28, 1988, pp. 1031–1033.

R. Lytel, G. F. Lipscomb, M. A. Stiller, J. I. Thackera, and A. J. Ticknor, "Organic Electro-Optic Waveguide Modulators and Switches" SPIE, vol. 971, Nonlinear Optical Properties of Organic Materials, (1988), pp. 218–229.

*Primary Examiner*—Brian Healy
*Attorney, Agent, or Firm*—Carl O. Thomas

[57] ABSTRACT

An optical article for the propagation of electromagnetic radiation is disclosed comprised of an electrically conductive support on which a poled polymeric film exhibiting a glass transition temperature of at least 80° C. and a second order polarization susceptibility greater than $10^{-9}$ electrostatic units is formed. A layer for enhancing the transmission of electromagnetic radiation is interposed between the electrically conductive support and the poled polymeric film. The transmission enhancement layer is an amorphous layer of at least 0.5 μm in thickness having a refractive index less than that of the polymeric film and a resistance less than 10 times that of the polymeric film. The transmission enhancement layer being comprised of a mixture of (a) at least one metal oxide or fluoride and (b) a low molecular weight aromatic compound.

16 Claims, 2 Drawing Sheets

NONLINEAR OPTICAL ARTICLE WITH IMPROVED BUFFER LAYER

FIELD OF THE INVENTION

The invention relates to optical articles for the nonlinear propagation of electromagnetic radiation.

BACKGROUND OF THE INVENTION

Nonlinear optics is concerned with the interactions of electromagnetic fields in various media to produce new fields altered in phase, frequency, amplitude, or other propagation characteristics from the incident fields. In order to gain an insight into the origin of nonlinear optical effects, the polarization P induced in a molecule by a local electric field E can be expressed by Equation 1:

$$P = \alpha E + \beta E^2 + \gamma E^3 ... \tag{1}$$

where
P is the total induced polarization,
E is the local electric field created by electromagnetic radiation, and
$\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 ... \tag{2}$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium. $\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)}E$, second order or first nonlinear polarization $\chi^{(2)}E^2$, and third order or second nonlinear polarization $\chi^3 E^3$.

D. J. Williams, "Organic Polymeric and Non-Polymeric Materials with Large Optical Nonlinearities", *Angew. Chem.* Int. Ed. Engl. 23 (1984) 690-703, and Zyss "Nonlinear Organic Materials for Integrated Optics", *Journal of Molecular Electronics*, Vol. 1. pp. 25-45, 1985, disclose a variety of nonlinear optical end uses that can be served by utilizing $\chi^{(2)}$ or $\chi^{(3)}$ properties of a propagation medium.

Interest in nonlinear optical devices has particularly centered on devices relying on second order polarization susceptibilities. To achieve on a macromolecular level second order polarization ($\chi^{(2)}E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

A significant difficulty encountered in finding suitable molecular dipoles for second order polarization effects lies in the molecular requirements that must be satisfied to achieve usefully large values of $\beta$. For a molecule to exhibit values of $\beta$ greater than zero, it is necessary that the molecule be asymmetrical about its center-that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment-e.g., the alignment obtained when molecular dipoles are placed in an electric field.

Second order polarization has ($\chi^{(2)}E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

For a number of years the materials employed for achieving second order polarization effects were noncentrosymmetric inorganic crystals, such as potassium dihydrogen phosphate and lithium niobate. Williams postulates mathematically and experimentally corroborates second order polarization susceptibilities in organic dipoles equalling and exceeding those of conventional inorganic dipoles.

A number of difficulties have been encountered in attempting to prepare efficient optical devices employing an organic layer for the nonlinear propagation of electromagnetic radiation. If optical transmission is attempted through the organic layer while its lower surface is in direct contact with an electrode or other electrical conductor, significant optical losses are incurred. An optically passive layer, commonly referred to as a buffer layer, under the organic layer has been suggested to enhance transmission efficiency. Such arrangements are disclosed by Ulman et al U.S. Pat. No. 4,792,208, for example.

There are several difficulties involved. First, common inorganic deposition techniques, such as sputtering, molecular beam epitaxy, chemical vapor deposition, and the like, produce comparatively thin layers that are optically inefficient in reducing electromagnetic energy losses.

While there are varied techniques available for the deposition of thicker organic buffer layers beneath optically active layers, these layers are susceptible to degradation during formation of high $\chi^{(2)}$ poled polymeric films as nonlinear optical layers. A typical technique for forming a high $\chi^{(2)}$ poled polymeric film entails solvent casting followed by heating the polymeric film above its glass transition temperature, usually well in excess of 50° C., while applying a potential bias to achieve electrical field alignment of organic molecular dipoles contained in the polymeric film. Both the solvents employed for casting and the elevated temperatures employed for poling can degrade the underlying buffer layer.

J. I. Thackera, G. F. Lipscomb, M. A. Stiller, A. J. Ticknor, and R. Lytel, "Poled Electro-Optic Waveguide Formation in Thin-Film Organic Media", Appl. Phys. Lett. 52 (13), 28 March 1988, pp. 1031–1033, and, by the same authors, "Organic Electro-Optic Waveguide Modulators and Switches" SPIE Vol. 971 Nonlinear Optical Properties of Organic Materials (1988), pp. 218–229, are examples of attempts to use organic buffer layers in combination with organic nonlinear optical propagation layers.

Metal fluorides and oxides have been employed with optical articles, such as lenses Mathers et al U.S. Pat. No. 2,441,668; Socha U.S. Pat. No. 3,176,575; and Hoffman U.S. Pat. No. 3,883,214 are illustrative.

RELATED PATENT APPLICATIONS

Brazas et al U.S. Ser. No. 273,785, filed Nov. 21, 1988, commonly assigned, discloses depositing on a support an optical conduction layer of a low molecular weight organic compound having a glass transition temperature above about 50° C. In one form an overlying portion of the layer has a differing refractive index than the underlying portion and is patterned to form an optical element.

Scozzafava et al AN IMPROVED NONLINEAR OPTICAL DEVICE U.S. Ser. No. 419,818, pending concurrently filed, commonly assigned, discloses the formation of an optical article by employing an amorphous low molecular weight organic compound as a transmission enhancement layer over an organic layer for the nonlinear transmission of electromagnetic radiation.

Rider et al HIGH $\chi^{(2)}$ OPTICAL ARTICLE U.S. Ser. No. 419,984, pending, concurrently filed, commonly assigned, discloses the use of metal fluoride and oxide layers of thicknesses of less than 0.1 $\mu$m between a conductive layer containing a metal of a moderate work function and poled polymeric medium having a glass transition temperature of at least 50° C.

Schildkraut et al OPTICAL ARTICLE FOR REFLECTION MODULATION U.S. Ser. No. 419,817, pending, concurrently filed, commonly assigned, discloses an optical article intended for modulation of reflected electromagnetic radiation comprised of a prism support onto which are formed in sequence (a) a layer formed of at least one of a metal fluoride or oxide and a low molecular weight aromatic compound, (b) a negative dielectric constant layer, (c) a layer exhibiting a change in its refractive index as a function of a potential bias impressed upon it, and (d) an electrode.

SUMMARY OF THE INVENTION

In one aspect this invention is directed to an optical article for the propagation of electromagnetic radiation comprised of an electrically conductive support, a poled polymeric film located on the support exhibiting a glass transition temperature of at least 50° C. and a second order polarization susceptibility greater than $10^{-9}$ electrostatic units, and a transmission enhancement layer interposed between said conductive support and said polymeric film.

The optical article is characterized in that the transmission enhancement layer is an amorphous layer of at least 0.5 $\mu$m in thickness having a refractive index less than that of the polymeric film and a resistance less than 10 times that of the polymeric film. The transmission enhancement layer is comprised of a mixture of (a) at least one metal oxide or fluoride and (b) a low molecular weight aromatic compound.

It has been discovered that employing (a) and (b) in combination as more specifically described below a combination of advantages are realized. First, a smooth layer of a thickness appropriate for reducing optical losses from an overlying nonlinear optical propagation layer can be realized, whereas this has not been successfully achieved employing only inorganic metal oxides or fluorides. Second, the combination of (a) and (b) provides a layer that is stable under the stringent conditions of poling at temperatures of 50° C. or higher, whereas attempts to form transmission enhancement layers as underlayers containing (b) alone have been unsuccessful. Third, by employing (a) and (b) in combination a range of varied refractive indices for the transmission enhancement layer can be realized. This permits the refractive index of the transmission enhancement layer to be adjusted in relation to that of the poled polymeric layer to achieve more efficient optical propagation.

DESCRIPTION OF PREFERRED EMBODIMENTS

The invention is applicable to the propagation of electromagnetic radiation in the wavelength ranges commonly encountered by nonlinear optical articles—e.g., wavelengths ranging from the near ultraviolet, typically 300 to 400 nm, through the visible of 400 to 700 nm and well into the infrared up to wavelengths of 2.0 $\mu$m or more. The optical articles of the invention are particularly useful with solid state lasers providing input wavelengths in the range from about 550 to 1500 nm. Second harmonic wavelengths internally generated are, of course, half the input radiation wavelengths.

Figure 1:
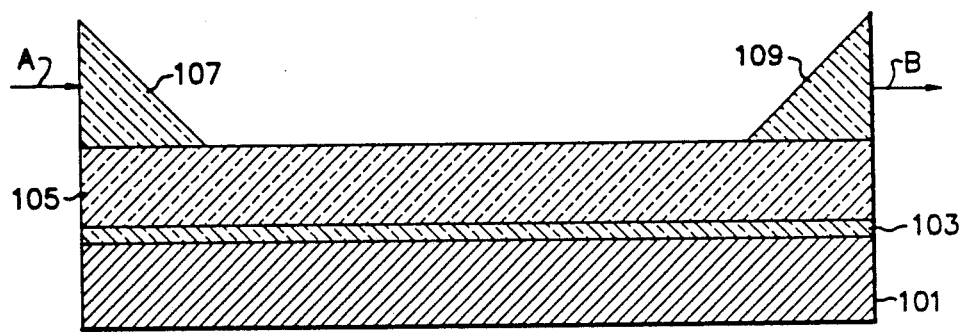
FIG. 1 is a schematic view of one embodiment of a nonlinear optical device according to the invention.

In FIG. 1 an optical article 100 capable of the nonlinear transmission of electromagnetic radiation is shown. Electromagnetic radiation is supplied to the device, as indicated at A, and exits from the device, as indicated at B, with an internally generated second harmonic of the frequency of the electromagnetic radiation supplied contained as a component of the output electromagnetic radiation.

The optical article is comprised of an electrically conductive support 101, which can also function as a poling electrode. On the conductive support is formed a transmission enhancement layer 103 satisfying the requirements of the invention. A poled polymeric film 105 exhibiting a glass transition temperature of at least 50° C. (preferably at least 80° C.) and a high (greater than $10^{-9}$ esu) second order polarization susceptibility or $\chi^{(2)}$ is coated over the transmission enhancement layer. A prism 107 is positioned on the polymer film to introduce electromagnetic radiation into the film. A prism 109 is positioned on the polymeric film to receive electromagnetic radiation from the polymeric film.

Figure 2:
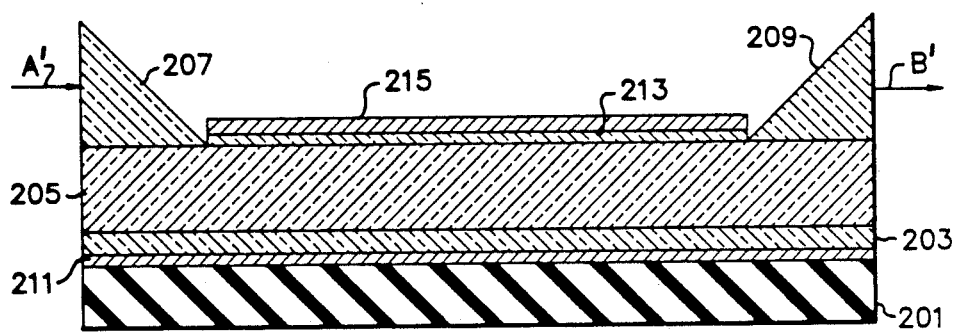
FIG. 2 is a schematic view of a preferred embodiment of a nonlinear optical device according to the invention.

In FIG. 2 an optical article 200 is shown which functions in the same manner as device 100. Electromagnetic radiation, indicated at A', is received by the device and exits the device as indicated at B', similarly as electromagnetic radiation B. Prisms 207 and 209 perform the same functions as prisms 107 and 109. Any or all of the prisms can be replaced by an alternative optical coupling means, such as an optical grating or a waveguide (e.g., an optical fiber).

Optical article 200 is constructed with an electrically insulative support 201 and a conductive metal layer 211 together forming a poling electrode. Transmission enhancement layer 203 and polymeric film 205 can be similar to layer 103 and film 105, described above. Onto the polymeric layer 205 is coated a second buffer layer 213 onto to which is deposited a second poling electrode 215.

The optical articles 100 and 200 are fabricated by slightly different poling techniques. In constructing both devices, after the transmission enhancement layer is formed on the underlying poling electrode, the polymeric film containing organic molecular dipoles, either as an integral part of a polymer or blended with a polymer is formed over the transmission enhancement layer. While any convenient conventional deposition technique can be employed, the most common deposition technique is solvent casting accompanied by spinning to obtain a smooth polymeric film of uniform thickness. As originally deposited the organic molecular dipoles are essentially randomly oriented, resulting in a film lacking the non-centro-symmetric orientation of the organic molecular dipoles required for realizing high $\chi^{(2)}$ values.

To achieve a $\chi^{(2)}$ it is necessary to heat the film to a temperature above its glass transition temperature so that the organic molecular dipoles can have the mobility required for alignment. Next, an electrical field gradient is applied across the polymeric layer.

In constructing optical article 100 a single poling electrode is used to apply the electrical field gradient across the polymeric film while it is heated above its $T_g$. A corona electrode (not shown) which forms no part of the completed device is positioned above and spaced from the polymeric film. By applying a potential difference between the corona electrode and the poling electrode a corona discharge above the polymeric film creates a surface charge on the polymeric film that acts as a counter electrode for poling. The molecular dipoles align themselves with the electrical field gradient in the polymeric film. By continuing the electrical bias across the electrodes while cooling the polymeric film back to ambient temperatures and below its glass transition temperature, the organic molecular dipoles are immobilized in their field aligned or poled arrangement.

In constructing optical article 200 the overlying buffer or transmission enhancement layer 213 and second poling electrode 215 are formed over the polymeric layer before poling. By subsequently heating of the polymeric layer above its $T_g$ and applying a potential difference between the layers 211 and 215 poling can be achieved with two electrodes similarly as poling is achieved with a single electrode as described above.

In preparing the optical articles and in their use the transmission enhancement layers perform useful and advantageous functions. In use, when electromagnetic radiation is being propagated in the poled polymeric film, it is not entirely confined to this film. If the polymeric film is in direct contact with an electrical conductor, such as a poling electrode, a significant portion of the electromagnetic radiation energy is dissipated within the device. To prevent this from occurring the dielectric transmission enhancement layers must be at least 0.5 $\mu$m in thickness, preferably at least 1 $\mu$m in thickness. The transmission enhancement layers are also preferably constructed of a lower refractive index than the polymeric layer. This favors internally reflecting electromagnetic radiation impinging on the enhancement transmission layers from the polymeric film.

While the minimum thicknesses of the transmission enhancement layers are dictated by optical considerations, they also facilitate protection of the electrodes during poling. Residual solvents and any other components of the polymeric films ar kept out of direct contact with the poling electrode surfaces, thereby avoiding chemical degradation of the electrodes during poling.

Notwithstanding their protective utility, the transmission enhancement layers are preferably limited in thickness to ranges that improve optical performance, typically less than 10 $\mu$m and preferably less than 5 $\mu$m. The reason for limiting the thickness of the transmission enhancement layers is that these layers constitute a resistance in series with the polymeric film during poling. It is desired to have a significant voltage drop within the polymeric film during poling to align the organic molecular dipoles. If the resistance of the transmission enhancement layer is too large in relation to that of the polymeric film during poling, most of the voltage gradient applied across the electrodes will appear in the transmission enhancement layer rather than in the polymeric film where it is needed for organic molecular dipole alignment. Therefore, it is contemplated that the transmission enhancement layers have resistances less than 10 times (preferably less than 5 times) that of the polymeric film when heated above its glass transition temperature. The electrical resistance of the transmission enhancement layers can be kept low by a combination of limiting their thickness and their resistivity.

Failures to achieve smooth transmission enhancement layers corresponding to layers 103 and 203 in the optically required thicknesses using inorganic materials led to attempts to form these layers with organic materials. It was found that organic layers greater than 0.5 $\mu$m in thickness could be readily formed. Unfortunately, the stringent conditions imposed by poling, including both the adverse effects of casting solvents and elevated temperatures, severely degraded organic layers.

The present invention is based upon the discovery that a blend of (a) at least one metal fluoride or oxide and (b) a low molecular weight aromatic compound is capable of producing smooth layers in the required thickness ranges as well as layers that resist degradation at poling temperatures well above 50° C. In fact, the transmission enhancement layers of this invention have shown acceptable stability of poling temperatures well above 100° C. and, by proper choice of ingredients, can provide stable coatings throughout common organic polymer poling temperature ranges—e.g., up to 150° C.

It is preferred to employ one or more metal fluorides or oxides in combination with a low molecular weight aromatic compound in weight ratios of (a):(b) of from 20:80 to 90:10 (preferably 50:50 to 80:20). The (a) and (b) components together produce smooth amorphous coatings that serve as excellent substrates for spin casting or otherwise depositing uniform polymeric films.

The coatings remain stable under the casting and poling conditions required to form the poled polymeric films. Additionally, the diversity of materials from which (a) and (b) can be selected and the available variance of their proportions facilitates tailoring the refractive indices of the layers containing (a) and (b) in relation to the refractive index of the poled polymeric layer for optimum optical performance.

By "amorphous" it is meant that there is substantially no crystallinity in the layer or microstructure attributed to the coating process. This can be determined by visual inspection under a microscope; by Raman spectroscopic techniques; or by the observation of scattered light from the waveguide or device.

The term "low molecular weight" is employed to designate those aromatic compounds having a molecular weight below about 1000. In other words, film forming polymers, which typically have a molecular weight of at least 5000, are excluded.

Low molecular weight aromatic compounds whose vapor pressure is sufficiently high so that the compound can be vacuum deposited are preferred.

Low molecular weight aromatic compounds are useful in the present invention are solids at room temperature. They preferably have a glass transition temperature of greater than about 50° C. Glass transition temperature is measured using conventional techniques, such as differential scanning calorimetry. The measurement should be taken from amorphous bulk material that is substantially free from residual solvents and decomposition products since that is the condition of the materials when they are vacuum coated.

The low molecular weight aromatic compounds employed in forming the transmission enhancement layers described herein contain at least one aromatic carbocyclic or heterocyclic ring. In a preferred form the compounds can be the "multicyclic aromatic nucleus" compounds described in U.S. Pat. No. 4,499,165 or derivatives A "multicyclic aromatic nucleus" is a nucleus comprising at least two cyclic groups one of which is aromatic, including aromatic heterocyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole oxazole, imide, pyrazole, triazole, oxadiazole, pyridine, pyrimidine, pyrazine, triazine, tetrazine and quinoline groups. The substituents are fused or non-fused and mono or polycyclic. Examples of multicyclic aromatic nuclei include 9,9-bis(4-hydroxy-3,5-dichlorophenyl)fluorene, 4,4'-hexahydro-4,7-methanoindan-5-ylidenebis(2,6-dichlorophenol); 9,9-bis(4-hydroxy-3,5-dibromophenyl)-fluorene, 4,4'-hexahydro-4,7-methanoindan-5-ylidene-bis(2,6-dibromophenol); 3',3",5',5"-tetrabromophenolphthalein, 9,9-bis(4-aminophenyl)fluorene, phenylindandiols; 1,1'-spirobiindandiols, 1,1'-spirobiindandiamines, 2,2'-spirobichromans; 7,7-dimethyl-7H-dibenzo[c,h]xanthenediol; 9,9-dimethylxanthene-3,6-bis-(oxyacetic acids); 4,4'-(3-phenyl-1-indanylidene)diphenol and other bisphenols; 9-phenyl-3-oxo-2,6,7-trihydroxyxanthene; and the like.

Useful multicyclic aromatic nuclei compounds are:

A. The phenylindan diols disclosed in *Research Disclosure*, Item No. 11833, February 1974, and U.S. Pat. Nos. 3,803,096, 3,859,364 and 3,886,124 and the phenylindan diamines of U.S. Pat. Nos. 3,897,253 and 3,915,939, B. The 1,1'-spirobiindan diols and diamines disclosed in U.S. Pat. No. 3,725,070; and the 1,1'-spirobiindan (dicarboxylic acids) of *Research Disclosure*, Item No. 9830, June 1972 (anonymous).

C. The 1,1'-spirobiindan 5,5'-diamines disclosed in *Research Disclosure*, Item No. 13117, March 1975, D. The 2,2'-spirobichromans disclosed in U.S. Pat. No. 3,859,097, E. The 7,7-dimethyl-7H-dibenzo[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, June 1972 (anonymous), G. The 4,4'-(3-phenyl-1-indanylidene)diphenols disclosed in *Research Disclosure*, Item No. 13101, March 1975, H. The 4,4'-(hexahydro-4,7-methanoindan-5-ylidene)diphenols disclosed in *Research Disclosure*, Item No. 13568, July 1975, I. The bisphenols disclosed in *Research Disclosure*, Item No. 13569, July 1975, J. The sulfonyldibenzoic acids disclosed in *Research Disclosure*, Item No. 14016, December 1975, K. The polycyclic norbornanes of *Research Disclosure*, Item No. 9207, December 1971, and L. The 1,2,3,4-tetrahydronaphthalenes disclosed in *Research Disclosure*, Item No. 13570, July 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds. Preferred compounds are substituted phenylindan compounds and phthalimide compounds described below.

The phenylindan compounds have the structure:

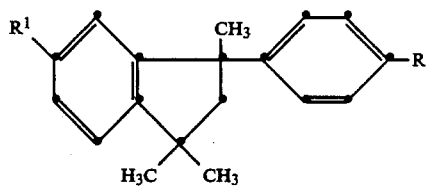

wherein R and $R^1$ are independently selected from the group consisting of nitro, amino, carboxyl, formamido groups, carbamoyl groups and heterocyclic groups derived from amino or carboxyl groups.

Useful formamido and carbamoyl groups are represented by the formulae —$NHCOR^2$ and —$CONR^2R^3$ respectively, wherein $R^2$ and $R^3$ are independently selected from the group consisting of unsubstituted and substituted aliphatic, aromatic and heterocyclic groups such that the molecular weight of the compound is less than about 1000.

Useful aliphatic groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-propenyl and 1-cyclohexenyl.

Useful aromatic groups include phenyl and naphthyl and substituted aromatic such as aromatic substituted with halogen, alkyl, cyano, alkoxy and hydroxy such as 4-methoxy phenyl and 3,4-dichloro phenyl.

Useful heterocyclic groups include pyridyl, furanyl, thiophenyl, quinolyl and piperidyl; and substituted heterocyclic such as heterocyclic substituted with alkyl, halogen and alkoxy such as 5-butylpyridyl.

Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

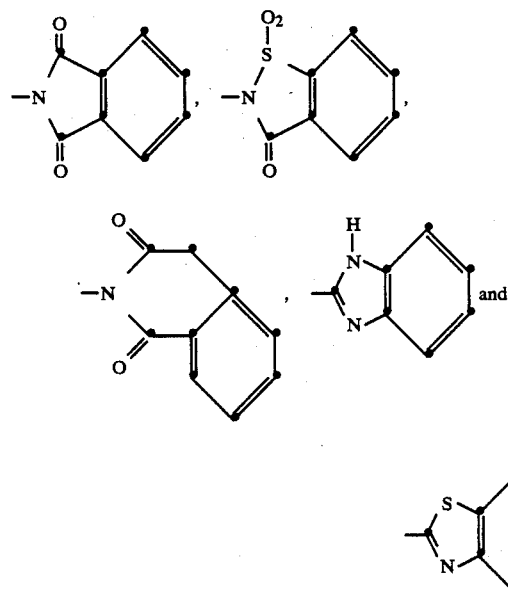

The formamido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane.

The similar carbamoyl compounds are made in a similar manner starting from the phenylindandicarboxylic acid, converting it to the corresponding acid chloride and reacting the acid chloride with the desired amine.

Where R and $R^1$ are different, mixtures of the side chain precursors are used and the compound isolated by liquid chromatography. In preferred embodiments, there is no need to resolve the mixture as it is useful directly.

Exemplary preferred phenylindan compounds are listed in Table I. All of the refractive indices reported in this table and subsequently were measured at 632 nm.

TABLE I

Structure: phenylindan with R substituents, CH3 at quaternary carbon, and H3C, CH3 gem-dimethyl groups.

| Compound | R | Refractive Index | Tg °C. |
|---|---|---|---|
| TEL-1 | —CONH₂ | 1.613 | 110 |
| TEL-2 | —NHCO—C₆H₄—OCH₃ | 1.630 | 114 |
| TEL-3 | —NHCO—C₆H₄—Cl | 1.629 | 118 |
| TEL-4 | —NHCO—C₆H₄—Br | 1.647 | 134 |
| TEL-5 | —NHCO—C₆H₄—CN | 1.677 | 138 |
| TEL-6 | —NHCO—C₆H₅ | 1.634 | 114 |
| TEL-7 | —NHCO—C₆H₃(Cl)(Cl) (3,4-dichloro) | 1.649 | 127 |
| TEL-8 | —NHCO—C₆F₅ | 1.548 | 123 |
| TEL-9 | —NHCO—naphthyl | 1.656 | 133 |
| TEL-10 | —CONH—C₆H₄—Br | 1.659 | 136 |

TABLE I-continued

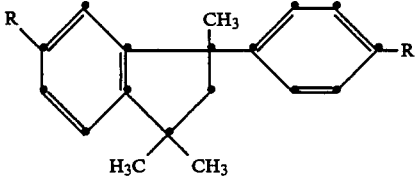

| Compound | R | Refractive Index | Tg °C |
|---|---|---|---|
| TEL-11 | —NHCO—(phenyl) | 1.569 | 150 |
| TEL-12 | —NHCOCH$_2$C(CH$_3$)$_3$ | 1.537 | 112 |
| TEL-13 | —NHCOCH$_2$CH$_2$CH$_3$ | 1.572 | 78 |
| TEL-14 | —NHCOCF$_2$CF$_2$CF$_3$ | 1.472 | 60 |
| TEL-15 | —CON—(phenyl)$_2$ | 1.548 | 99 |
| TEL-16 | —CONHC(CH$_3$)(CH$_3$)CH$_2$CH$_3$ | 1.545 | 86 |
| TEL-17 | (phthalimido with CH$_3$) | 1.660 | 128 |
| TEL-18 | Mixture of —NHCO—(phenyl)—Br and —NHCO—(naphthyl) | 1.654 | 121 |

TABLE I-continued

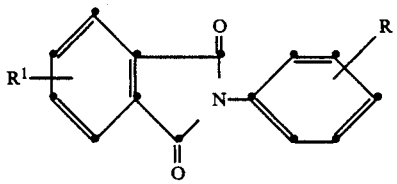

| Compound | R | Refractive Index | Tg °C |
|---|---|---|---|
| | —NHCO—(phenyl)—OCH$_3$ | | |

Preferred phthalimide compounds are disclosed by Machiele et al U.S. Ser. No. 273,550, filed Nov. 21, 1988, commonly assigned. The phthalimide compounds have the structure:

$$\text{R}^1\text{—(phthalimide)—N—(phenyl)—R}$$

wherein R and R$^1$ are as defined above.

The symmetrically substitutes compounds, that is R=R$^1$, are made starting with nitro phthalic anhydride. This is reacted with a nitroaniline to give a dinitro-N-phenyl-phthalimide. This in turn is reduced to the corresponding diamino compound which is then reacted with the oxychloride of the desired side chain.

The similar unsymmetrical compounds are made by reacting the appropriately substituted aniline with the proper nitro-phthalic anhydride followed by reduction to the corresponding amine. The amine is then reacted with the desired acid chloride.

Exemplary phthalimides are listed in Table II.

TABLE II

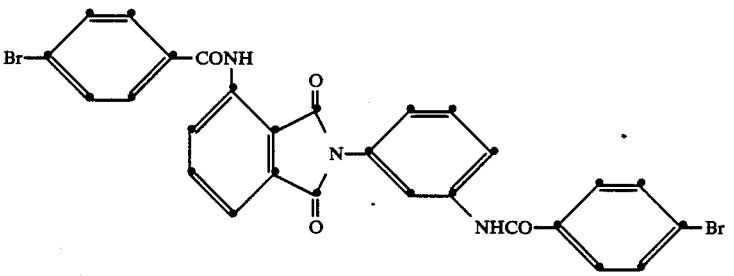

TEL-19  Br—(phenyl)—CONH—(phthalimide)—N—(phenyl)—NHCO—(phenyl)—Br

Index: 1.703
(second sample index = 1.705)
mp: >240°

TABLE II-continued
TEL-20 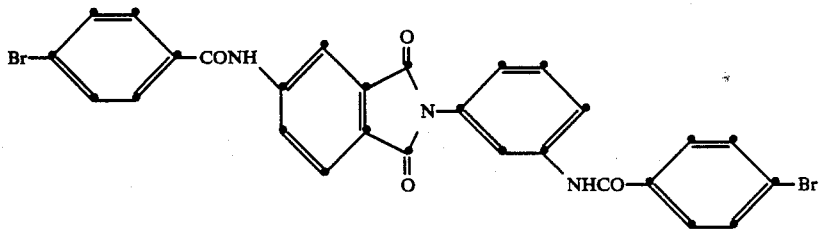 Index: 1.776
mp: >240°
TEL-21 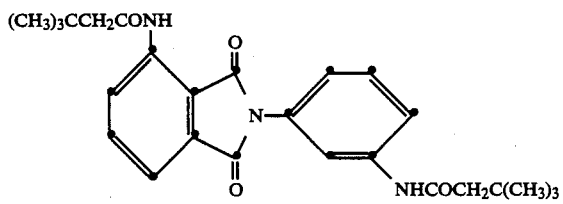 Index: 1.578
mp: 197–200°
TEL-22 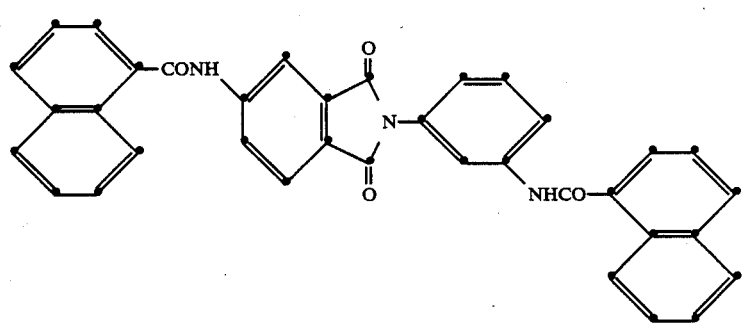 Index: 1.670
mp: >240°
TEL-23 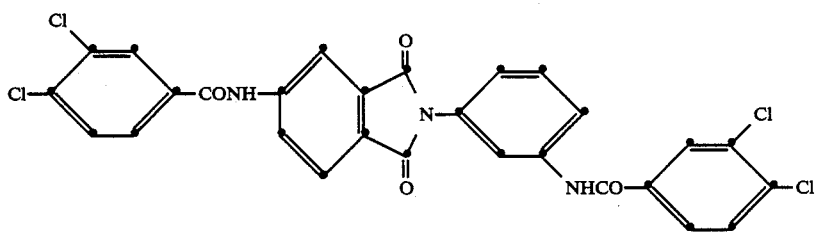 Index: 1.737
mp: >240°
TEL-24 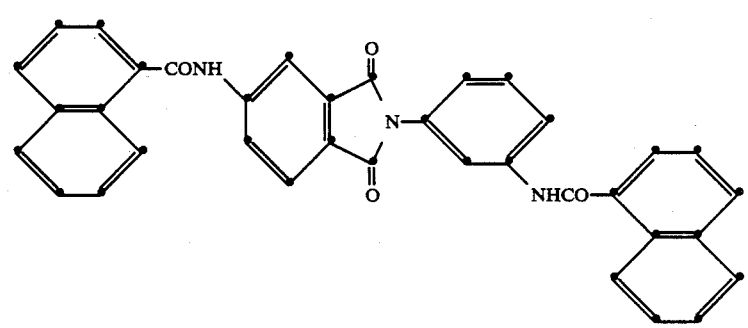 Index: 1.744
(50:50 mixture co-evaporated from sources)
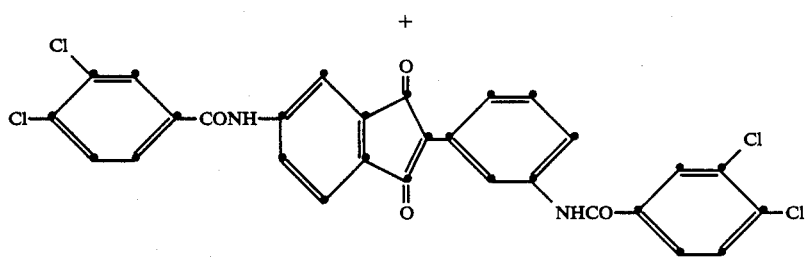

TABLE II-continued
TEL-25 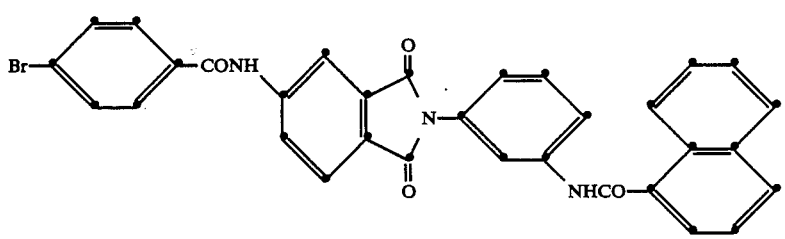 Index: 1.739
mp: 214–222°
TEL-26 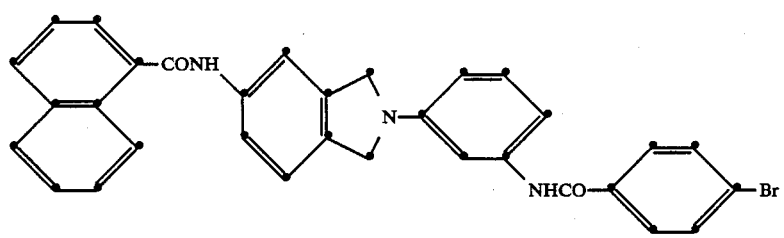 Index: 1.751
mp: 231–235°
TEL-27 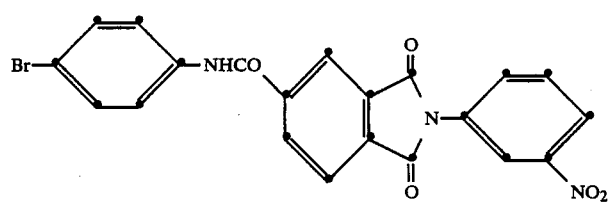 Index: 1.704
mp: 256–259°
TEL-28 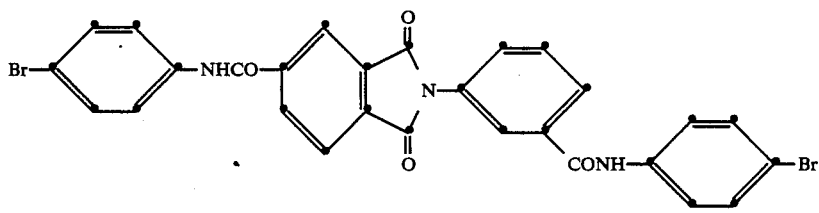 mp: >260°
TEL-29 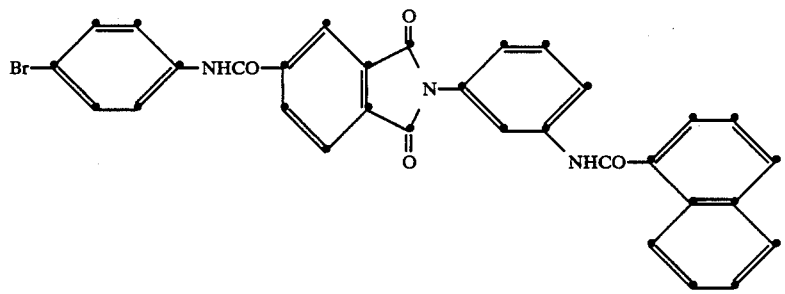
Still other exemplary low molecular weight aromatic compounds useful as transmission enhancement layers in the practice of this invention are listed in Table III.

TABLE III

| Compound | R | Refractive Index |
|---|---|---|
| TEL-30, -31, -32 (fluorene bis-amine: RHN—⟨aryl⟩—⟨fluorene⟩—⟨aryl⟩—NHR) | —COCH$_2$C(CH$_3$)$_3$<br>—H<br>—CO—⟨C$_6$H$_4$⟩—Br | 1.599<br>1.701<br>1.708 |
| TEL-33, -34 (tetrabromo bis-ether with fluorene core: RO—⟨Br$_2$-aryl⟩—⟨fluorene⟩—⟨Br$_2$-aryl⟩—OR) | —COCH$_2$C(CH$_3$)$_3$<br>—OH | 1.572<br>1.659 |
| TEL-35, -36, -37 (dimethyl-spirobiindane bis-ether: RO—⟨aryl⟩—⟨spiro(CH$_3$)$_4$⟩—⟨aryl⟩—OR) | —COCH$_2$C(CH$_3$)$_3$<br>—H<br>—CO—⟨C$_6$H$_4$⟩—Br | 1.514<br>1.575<br>1.610 |
| TEL-38, -39, -40 (bis-phthalimide: RNH—⟨aryl⟩—(phthalimide N)—⟨aryl⟩—NHR) | —COCH$_2$C(CH$_3$)$_3$<br>—H<br>—CO—⟨C$_6$H$_4$⟩—Br | 1.578<br>1.755<br>1.731 |

The (a) component of the transmission enhancement layers, individual or mixed metal fluorides, individual or mixed metal oxides, or mixtures of metal fluorides and metal oxides, can be chosen from a wide range of stable metal oxides and fluorides. Alkaline earth oxides (particularly magnesia), rare earth oxides, alumina, and silica constitute preferred metal oxides for use in the practice of this invention. However, any stable metal oxide that can be readily deposited in an amorphous form can be employed. Alkali metal fluorides (e.g., lithium fluoride) and alkaline earth metal fluorides (e.g., calcium or magnesium fluoride) constitute preferred metal fluorides. Rare earth fluorides are also contemplated. Mixed metal oxides, mixed metal fluorides, and mixtures of metal fluorides and oxides are all contemplated. Mixtures offer the advantage of increasing steric disorder, thereby suppressing crystallization and preserving the desired amorphous nature of the coating.

Any conventional deposition technique or any combination of conventional deposition techniques that permit concurrent blended depositions of the (a) and (b) components can be employed. Concurrent vacuum vapor deposition of the (a) and (b) components has been found particularly convenient. A detailed description of a preferred deposition procedure is provided in the Examples below.

The transmission enhancement layer 213 when present during poling is preferably of the composition described above. Instead of forming the transmission enhancement layer 213 according to the invention, a conventional buffer layer can be used at this location. An alternative preferred composition of the transmission enhancement layer 213 is as described above, but with the (a) component omitted. A transmission enhancement layer of this composition is the subject matter of Scozzafava et al AN IMPROVED NONLINEAR OPTICAL DEVICE, concurrently filed and cited above.

The electrode metals can take any convenient conventional form. It is common to employ noble metals, particularly gold, to provide poling electrodes or at least electrode poling surfaces. Preferred poling electrode metals are those having work functions in the range of from 3.5 to 4.5 eV. Silver is a particularly useful poling electrode metal, although a variety of other materials, such as indium tin oxide, copper, and aluminum also find wide use.

Any conventional high $\chi^{(2)}$ poled polymeric film can be utilized which provides an immobilizing matrix for the organic molecular dipoles at ambient or near ambient temperatures, but requires heating to at least 50° C. (preferably 80° C.) to effect poling, as noted above. The poled polymeric media of Ulman et al and Robello et al, cited above, are specifically contemplated as well as Robello European Patent Application No. 0,313,477, published Apr. 26, 1986, and Scozzafava et al U.S. Ser. No. 101,897, filed Sept. 28, 1987, commonly assigned.

Specifically preferred organic nonlinear optical layers are those which can be formed by poling linear condensation and vinyl polymers including non-centrosymmetric molecular dipoles as pendant or backbone groups. The molecular dipoles include an electron donor moiety, such as an amino, oxy, or thio group, linked through a conjugated π bonding system to an electron acceptor moiety, such as a sulfonyl, cyano, or nitro group, to permit oscillation of the molecular dipole between a lower polarity ground state and a higher polarity excited state. A preferred conjugated π bonding system is provided by a 4,4'-stilbene or 4,4'-diazobenzene linkage between the electron acceptor or electron donor moiety. The molecular dipole can be linked to the polymer backbone through the electron donor or acceptor moiety or incorporated in the polymer backbone by linkages through both the electron acceptor and donor moieties.

The following are illustrative of preferred molecular dipole monomers suitable for producing condensation polymers that can be poled to form the nonlinear optical layers:

TABLE IV

| | |
|---|---|
| NOCM-1 | 4'-{N-[5-(Methoxycarbonyl)pentyl]-N-methylamino}-4-(6-hydroxyhexyl)sulfonylazobenzene |
| NOCM-2 | 4'-{N-[5-(Butoxycarbonyl)pentyl]-N-methylamino}-4-(6-hydroxyhexyl)sulfonylazobenzene |
| NOCM-3 | 4'-{N-[5-(Methoxycarbonyl)pentyl]-N-methylamino}-4-(6-hydroxyhexyl)sulfonylstilbene |
| NOCM-4 | 4'-{N-[5-(Butoxycarbonyl)pentyl]-N-methylamino}-4-(6-hydroxyhexyl)sulfonylstilbene |
| NOCM-5 | 4'-[N-(Methoxycarbonyl)methyl-N-methylamino]-4-(6-hydroxyhexyl)sulfonylazobenzene |
| NOCM-6 | 4'-[N-(Ethoxycarbonyl)methyl-N-methylamino]-4-(6-hydroxyhexyl)sulfonylazobenzene |
| NOCM-7 | 4'-[N-(Methoxycarbonyl)methyl-N-methylamino]-4-(6-hydroxyhexyl)sulfonylstilbene |
| NOCM-8 | 4'-[N-(Ethoxycarbonyl)methyl-N-ethylamino]ethylamino]-4-(6-hydroxyhexyl)sulfonylstilbene |
| NOCM-9 | 4'-[N-(6-Hydroxyhexyl)-N-methylamino]-4-[2-(methoxycarbonyl)ethyl]sulfonylazobenzene |
| NOCM-10 | 4'-[N-(6-Hydroxyhexyl)-N-methylamino]-4-[2-(ethoxycarbonyl)ethyl]sulfonylazobenzene |
| NOCM-11 | 4'-[N-(6-Hydroxyhexyl)-N-methylamino]-4-[2-(methoxycarbonyl)ethyl]sulfonylstilbene |
| NOCM-12 | 4'-[N-(6-Hydroxyhexyl)-N-methylamino]-4-[2-(ethoxycarbonyl)ethyl]sulfonylstilbene |
| NOCM-13 | 4'-[N-(2-Hydroxyethyl)-N-methylamino]-4-[2-(methoxycarbonyl)ethyl]sulfonylazobenzene |
| NOCM-14 | 4'-[N-(2-Hydroxyethyl)-N-methylamino]-4-[2-(ethoxycarbonyl)ethyl]sulfonylazobenzene |
| NOCM-15 | 4'-[N-(2-Hydroxyethyl)-N-methylamino]-4-[2-(methoxycarbonyl)ethyl]sulfonylstilbene |
| NOCM-16 | 4'-[N-(2-Hydroxyethyl)-N-methylamino]-4-[2-(ethoxycarbonyl)ethyl]sulfonylstilbene |
| NOCM-17 | 4'-[N-(2-Hydroxyhexyl)-N-methylamino]-4-[5-(methoxycarbonyl)pentyl]sulfonylazobenzene |
| NOCM-18 | 4'-[N-(2-Hydroxyhexyl)-N-methylamino]-4-[5-(methoxycarbonyl)pentyl]sulfonylstilbene |
| NOCM-19 | 4'-(4 Hydroxy-1-piperidinyl)-4-[2-(methoxycarbonyl)ethyl]sulfonylazobenzene |
| NOCM-20 | 4'-(4 Hydroxy-1-piperidinyl)-4-[2-(methoxycarbonyl)ethyl]sulfonylstilbene |

The following are illustrative of preferred molecular dipole members suitable for producing vinyl polymers that can be poled to form the nonlinear optical layers:

TABLE V

| | |
|---|---|
| NOVM-1 | 4'-[N-(2-acryloyloxyethyl-N-methylamino]-4-methylsulfonylstilbene |
| NOVM-2 | 4'-[N-(2-methacryloyloxyethyl-N-methylamino]-4-methylsulfonylstilbene |
| NOVM-3 | 4'-[N-(6-acryloyloxyhexyl)-N-methylamino]-4-methylsulfonylstilbene |
| NOVM-4 | 4'-[N-(6-methacryloyloxyhexyl) ethylamino]-4-methylsulfonylstilbene |
| NOVM-5 | 4'[-4-acryloyloxy-1-piperidyl -4-methylsulfonylstilbene |
| NOVM-6 | 4'[-4-methacryloyloxy-1-piperidyl -4-methylsulfonylstilbene |
| NOVM-7 | 4'-[N-(2-acryloyloxyethyl)-N-methylamino]-4-phenylsulfonylstilbene |
| NOVM-8 | 4'-[N-(2-methacryloyloxyethyl)-N-methylamino]-4-phenylsulfonylstilbene |
| NOVM-9 | 4'-[N-(6-acryloyloxyhexyl)-N-methylamino]-4-phenylsulfonylstilbene |
| NOVM-10 | 4'-[N-(6-methacryloyloxyhexyl)-N-methylamino]-4-phenylsulfonylstilbene |
| NOVM-11 | 4'[-4-acryloyoxy-1-piperidyl -4-phenylsulfonylstilbene |
| NOVM-12 | 4'[-4-methacryloyloxy-1-piperidyl -4-phenyl sulfonylstilbene |
| NOVM-13 | 4'-[N-(2-acryloyloxyethyl)-N-methylamino]-4-(R-2-methylbutyl)sulfonylstilbene |
| NOVM-14 | 4'-[N-(2-methacryloyloxyethyl)-N-methylamino]-4-(R-2-methylbutyl)sulfonylstilbene |
| NOVM-15 | 4'-[N-(6-acryloyloxyethyl)-N-methylamino]-4-(R-2-methylbutyl)sulfonylstilbene |
| NOVM-16 | 4'-[N-(6-methacryloyloxyethyl)-N-methylamino]-4-(R-2-methylbutyl)sulfonylsilbene |
| NOVM-17 | 4'[-4-acryloyloxy-1-piperidyl -4-(R-2-methylbutyl)sulfonylstilbene |
| NOVM-18 | 4'[-4-methacryloyloxy-1-piperidyl -4-(R-2-methylbutyl)sulfonylstilbene |
| NOVM-19 | 4'-(2-acryloyloxyethoxy)-4-methylsulfonyl stilbene |
| NOVM-20 | 4'-(2-methacryloyloxyethoxy)-4-methylsulfonylstilbene |
| NOVM-21 | 4'-(6-acryloyloxyhexoxy)-4-methylsulfonylstilbene |
| NOVM-22 | 4'-(6-methacryloyloxyhexoxy)-4-methylsulfonylstilbene |
| NOVM-23 | 4'-(2-acryloyloxyethoxy)-4-phenylsulfonylstilbene |
| NOVM-24 | 4'-(2-methacryloyloxyethoxy)-4-phenylsulfonylstilbene |
| NOVM-25 | 4'-(6-acryloyloxyhexoxy)-4-phenylsulfonylstilbene |
| NOVM-26 | 4'-(6-methacryloyloxyhexoxy)-4-phenylsulfonylstilbene |
| NOVM-27 | 4'-(2-acryloyloxyethoxy)-4-(R-2-methylbutyl)sulfonylstilbene |
| NOVM-28 | 4'-(2-methacryloyloxyethoxy)-4-(R-2-methylbutyl)sulfonylstilbene |
| NOVM-29 | 4'-(6-acryloyloxyhexoxy)-4-(R-2-methylbutyl)sulfonylstilbene |
| NOVM-30 | 4'-(6-methacryloyloxyhexoxy)-4-(R-2-methylbutyl)sulfonylstilbene |
| NOVM-31 | 4'-(2-acryloyloxyethylthio)-4-methylsulfon- |

TABLE V-continued

| | |
|---|---|
| NOVM-32 | 4'-(2-methacryloyloxyethylthio)-4-methylsulfonylstilbene |
| NOVM-33 | 4'-(6-acryloyloxyhexylthio)-4-methylsulfonylstilbene |
| NOVM-34 | 4'-(6-methacryloyloxyhexylthio)-4-methylsulfonylstilbene |
| NOVM-35 | 4'-(2-acryloyloxyethylthio)-4-phenylsulfonylstilbene |
| NOVM-36 | 4'-(2-methacryloyloxyethylthio)-4-phenylsulfonylstilbene |
| NOVM-37 | 4'-(6-acryloyloxyhexylthio)-4-phenylsulfonylstilbene |
| NOVM-38 | 4'-(6-methacryloyloxyhexylthio)-4-phenylsulfonylstilbene |
| NOVM-39 | 4'-(2-acryloyloxyethylthio)-4-(R-2-methylbutyl)sulfonylstilbene |
| NOVM-40 | 4'-(2-methacryloyloxyethylthio)-4-(R-2-methylbutyl)sulfonylstilbene |
| NOVM-41 | 4'-(6-acryloyloxyhexylthio-4-(R-2-methylbutyl)sulfonylstilbene |
| NOVM-42 | 4'-(6-methacryloyloxyhexylthio-4-(R-2-methylbutyl)sulfonylstilbene |
| NOVM-43 | 4'-dimethylamino-4-(6-acryloyloxyhexyl)sulfonylstilbene |
| NOVM-44 | 4'-'dimethylamino-4-(6-methacryloyloxyhexyl)sulfonylstilbene |
| NOVM-45 | 4'-(1-pyrrolidino)-4-(6-acryloyloxyhexyl)sulfonylstilbene |
| NOVM-46 | 4'-(1-pyrrolidino)-4-(6-methacryloyloxyhexyl)sulfonylstilbene |
| NOVM-47 | 4'-[N-(R-2-methylbutyl)-N-methylamino]-4-(6-acryloyloxyhexyl)sulfonylstilbene |
| NOVM-48 | 4'-[N-(R-2-methylbutyl)-N-methylamino]-4-(6-methacryloyloxyhexyl)sulfonylstilbene |
| NOVM-49 | 4'-methoxy-4-(6-acrloyloxyhexyl)sulfonylstilbene |
| NOVM-50 | 4'-methoxy-4-(6-methacryloyloxyhexyl)sulfonylstilbene |
| NOVM-51 | 4'-(R-2-methylbutoxy)-4-(6-acryloyloxyhexyl)sulfonylstilbene |
| NOVM-52 | 4'-(R-2-methylbutoxy)-4-(6-methacryloyloxyhexyl)sulfonylstilbene |
| NOVM-53 | 4'-methylthio-4-(6-acryloyloxyhexyl)sulfonylstilbene |
| NOVM-54 | 4'-methylthio-4-(6-methacryloyloxyhexyl)sulfonylstilbene |
| NOVM-55 | 4'-(R-2-methylbutylthio)-4-(6-acryloyloxyhexyl)sulfonylstilbene |
| NOVM-56 | 4'-(R-2-methylbutylthio)-4-(6-methacryloyloxyhexyl)sulfonylstilbene |
| NOVM-57 | 4'-[N-(2-acryloyloxyethyl)-N-methylamino]-4-methylsulfonylazobenzene |
| NOVM-58 | 4'-[N-(2-methacryloyloxyethyl)-N-ethylamino]-4-methylsulfonylazobenzene |
| NOVM-59 | 4'[N-(6-acryloyloxyhexyl)-N-ethylamino]-4-methylsulfonylazobenzene |
| NOVM-60 | 4'[N-(6-methacryloyloxyhexyl)-N-methylamino]-4-methylsulfonylazobenzene |
| NOVM-61 | 4'-[4-acryloyloxy-1-piperidyl -4-methylsulfonylazobenzene |
| NOVM-62 | 4'[4-methacryloyloxy-1-piperidyl -4-methylsulfonylazobenzene |
| NOVM-63 | 4'-[N-(2-acryloyloxyethyl)-N-methylamino]-4-phenylsulfonylazobenzene |
| NOVM-64 | 4'-[N-(2-methacryloyloxyethyl)-N-methylamino]-4-phenylsulfonylazobenzene |
| NOVM-65 | 4'-[N-(6-acryloyloxyhexyl)-N-methylamino]-4-phenylsulfonylazobenzene |
| NOVM-66 | 4'-[N-(6-methacryloyloxyhexyl)-N-methylamino]-4-phenylsulfonylazobenzene |
| NOVM-67 | 4'-[4-acryloyloxy-1-piperidyl -4-phenylsulfonylazobenzene |
| NOVM-68 | 4'-[4-methacryloyloxy-1-piperidyl -4-phenylsulfonylazobenzene |
| NOVM-69 | 4'-[N-(2-acryloyloxyethyl)-N-methylamino]-4-(R-2-methylbutyl)sulfonylazobenzene |
| NOVM-70 | 4'-[N-(2-methacryloyloxyethyl)-N-methylamino]-4-(R-2-methylbutyl)sulfonylazobenzene |
| NOVM-71 | 4'-[N-(6-acryloyloxyhexyl)-N-methylamino]-4-(R-2-methylbutyl)sulfonylazobenzene |
| NOVM-72 | 4'-[N-(6-methacryloyloxyhexyl)-N-methylamino]-4-(R-2-methylbutyl)sulfonylazobenzene |
| NOVM-73 | 4'[-4-acryloyloxy-1-piperidyl -4-(R-2-methylbutyl)sulfonylazobenzene |
| NOVM-74 | 4'[-4-methacryloyloxy-1-piperidyl -4-(R-2-methylbutyl)sulfonylazobenzene |
| NOVM-75 | 4'-(2-acryloyloxyethoxy)-4-methylsulfonylazobenzene |
| NOVM-76 | 4'-(2-methacryloyloxyethoxy)-4-methylsulfonylazobenzene |
| NOVM-77 | 4'-(6-acryloyloxyhexoxy)-4-methylsulfonylazobenzene |
| NOVM-78 | 4'-(6-methacryloyloxyhexoxy)-4-methylsulfonylazobenzene |
| NOVM-79 | 4'-(2-acryloyloxyethoxy)-4-phenylsulfonylazobenzene |
| NOVM-80 | 4'-(2-methacryloyloxyethoxy)-4-phenylsulfonylazobenzene |
| NOVM-81 | 4'-(6-acryloyloxyhexoxy)-4-phenylsulfonylazobenzene |
| NOVM-82 | 4'-(6-methacryloyloxyhexoxy)-4-phenylsulfonylazobenzene |
| NOVM-83 | 4'-(2-acryloyloxyethoxy) '-4-(R-2-methylbutyl)-sulfonylazobenzene |
| NOVM-84 | 4'-(2-methacryloyloxyethoxy)-4-(R-2-methylbutyl)sulfonylazobenzene |
| NOVM-85 | 4'-(6-acryloyloxyhexoxy)-4-(R-2-methylbutyl)sulfonylazobenzene |
| NOVM-86 | 4'-(6-methacryloyloxyhexoxy)-4-(R-2-methylbutyl)sulfonylazobenzene |
| NOVM-87 | 4'-(2-acryloyloxyethylthio)-4-methylsulfonylazobenzene |
| NOVM-88 | 4'-(2-methacryloyloxyethylthio)-4-methylsulfonylazobenzene |
| NOVM-89 | 4'-(6-acryloyloxyhexylthio)-4-methylsulfonylazobenzene |
| NOVM-90 | 4'-(6-methacryloyloxyhexylthio)-4-methylsulfonylazobenzene |
| NOVM-91 | 4'(2-acryloyloxyethylthio)-4-phenylsulfonylazobenzene |
| NOVM-92 | 4'-(2-methacryloyloxyethylthio)-4-phenylsulfonylazobenzene |
| NOVM-93 | 4'-(6-acryloyloxyhexylthio)-4-phenylsulfonylazobenzene |
| NOVM-94 | 4'-(6-methacryloyloxyhexylthio)-4-phenylsulfonylazobenzene |
| NOVM-95 | 4'(2-acryloyloxyethylthio)-4-(R-2-methylbutyl)sulfonylazobenzene |
| NOVM-96 | 4'(2-methacryloyloxethylthio)-4-(R-2-methylbutyl)sulfonylazobenzene |
| NOVM-97 | 4'-(6-acryloyloxyhexylthio)-4-(R-2-methylbutyl)sulfonylazobenzene |
| NOVM-98 | 4'-(6-methacryloyloxyhexylthio)-4-(R-2-methylbutyl)sulfonylazobenzene |
| NOVM-99 | 4'-dimethylamino-4-(2-acryloyloxyethyl)sulfonylazobenzene |
| NOVM-100 | 4'-dimethylamino-4-(2-methacryloyloxyethyl)sulfonylazobenzene |
| NOVM-101 | 4'-dimethylamino-4-(6-acryloyloxyhexyl)sulfonylazobenzene |
| NOVM-102 | 4'-dimethylamino-4-(6-methacryloyloxyhexyl)sulfonylazobenzene |
| NOVM-103 | 4'-(1-pyrrolidino)-4-(2-acryloyloxyethyl)sulfonylazobenzene |
| NOVM-104 | 4'-(1-pyrrolidino)-4-(2-methacryloyloxyethyl)sulfonylazobenzene |
| NOVM-105 | 4'-(1-pyrrolidino)-4-(6-acryloyloxyhexyl)sulfonylazobenzene |
| NOVM-106 | 4'-(1-pyrrolidino)-4-(6-methacryloyloxyhexyl)sulfonylazobenzene |
| NOVM-107 | 4'-dimethylamino-4-(6-acryloyloxyhexyl)sulfonylazobenzene |
| NOVM-108 | 4'-dimethylamino-4-(6-methacryloyloxyhexyl)sulfonylazobenzene |
| NOVM-109 | 4'-(1-pyrrolidino-4-(6-acryloyloxyhexyl)sulfonylazobenzene |
| NOVM-110 | 4'-(1-pyrrolidino-4-(6-methacryloyloxyhexyl)sulfonylazobenzene |
| NOVM-111 | 4'[N-(R-2-methylbutyl)-N-methylamino]-4-(6-acryloyloxyhexyl)sulfonylazobenzene |
| NOVM-112 | 4'[N-(R-2-methylbutyl)-N-methylamino]-4-(6-methacryloyloxyhexyl)sulfonylazobenzene |
| NOVM-113 | 4'-methoxy-4-(6-acryloyloxyhexyl)sulfonyl- |

TABLE V-continued

| | |
|---|---|
| | azobenzene |
| NOVM-114 | 4'-methoxy-4-(6-methacryloyloxyhexyl)sulfonylazobenzene |
| NOVM-115 | 4'-(R-2-methylbutoxy)-4-(6-acryloxyhexyl)-sulfonylazobenzene |
| NOVM-116 | 4'-(R-2-methylbutoxy)-4-(6-methacryloxyhexyl)sulfonylazobenzene |
| NOVM-117 | 4'-methylthio-4-(6-acryloxyhexyl)sulfonylazobenzene |
| NOVM-118 | 4'-methylthio-4-(6-methacryloxyhexyl)sulfonylazobenzene |
| NOVM-119 | 4'-(R-2-methylbutylthio)-4-(6-acryloxyhexyl)-sulfonylazobenzene |
| NOVM-120 | 4'-(R-2-methylbutylthio)-4-(6-acryloxyhexyl)sulfonylazobenzene |
| NOVM-121 | [-4-(6-acryloyloxyhexylsulfonyl)phenyl]ethene |
| NOVM-122 | [-4-(6-methacryloyloxyhexylsulfonyl)phenyl]diimine |

The following are illustrative of typical vinyl addition monomers that can be copolymerized with the vinyl molecular dipole monomers of Table V, if desired. The vinyl molecular dipole monomers can form 50 to 100 percent of the repeating units of the polymer, with vinyl addition monomers, such as those of Table VI, below, forming the balance of the repeating units of the polymer.

TABLE VI

| | |
|---|---|
| VCOM-1 | Methyl acrylate |
| VCOM-2 | Ethyl acrylate |
| VCOM-3 | Butyl acrylate |
| VCOM-4 | t-Butyl acrylate |
| VCOM-5 | Methyl chloroacrylate |
| VCOM-6 | Methyl methacrylate |
| VCOM-7 | Ethyl methacrylate |
| VCOM-8 | Butyl methacrylate |
| VCOM-9 | t-Butylmethacrylate |
| VCOM-10 | Styrene |
| VCOM-11 | 4-Methylstyrene |
| VCOM-12 | α-Methylstyrene |
| VCOM-13 | 4-t-Butylstyrene |
| VCOM-14 | 4-Hydroxystyrene |
| VCOM-15 | 4-Methoxystyrene |
| VCOM-16 | 4-Acetoxystyrene |
| VCOM-17 | 2-Vinylnaphthylene |
| VCOM-18 | Acrylonitrile |
| VCOM-19 | Acrylamide |
| VCOM-20 | N-Phenylmaleimide |
| VCOM-21 | N-Vinylpyrrolidone |
| VCOM-22 | Vinylacetate |
| VCOM-23 | Vinylchloride |
| VCOM-24 | Butadiene |
| VCOM-25 | Isoprene |
| VCOM-26 | Chloroprene |

Conventional details of device fabrication are also taught by the foregoing NLO citations.

EXAMPLES

The following specific examples further illustrate the practice of the invention:

EXAMPLE 1

An indium tin oxide (ITO) coated glass plate was placed in a vacuum chamber for deposition of a transmission enhancement layer satisfying the requirements of the invention. A low molecular weight phenylindan compound (TEL-11) was placed in the vacuum chamber in a quartz boat. In a tantalum boat was placed magnesium fluoride ($MgF_2$). At a pressure of $10^{-6}$ mm Hg the boat containing TEL-11 was resistively heated so that the phenylindan was evaporated onto the ITO at a rate of 4 to 5Å/sec. Simultaneously, the tantalum boat was heated so that the $MgF_2$ was evaporated onto the ITO at a rate of 10 to 11Å/sec. The final thickness of the transmission enhancement layer so deposited was 1.8 μm.

The sample was then removed from the vacuum chamber and mounted for spin coating. The sample surface onto which the transmission enhancement layer was covered with a solution containing a homopolymer of NOVM 60 ($T_g$ 100° C., refractive index 1.758) prepared by dissolving 2.5 g of the homopolymer in 10 mL of trichloropropane, adding one half drop of a commercial nonionic flurocarbon surfactant available under the tradename FC-170C, and filtering through a 0.2 μm Millipore TM filter The sample was spun at 500 revolutions per minute (rpm). The resulting sample was then placed in a vacuum oven at 120° C. overnight.

Onto the polymeric film was coated 500Å of gold. The final form of the device with the thickness of each layer is shown below:

| |
|---|
| Gold (500Å) |
| Homopolymer of NOVM 60 (2.4 μm) |
| $MgF_2$: TEL-11 Wt. ratio 75:25 (1.8 μm) |
| ITO (2000Å) |
| Glass Plate |

The polymeric film was then poled as follows: A voltage of 400 volts was applied across the device while heating to a temperature of 89° C. The device with the voltage applied was held at this temperature for 1 hour and then allowed to cool to room temperature with the voltage still applied. The poled polymeric film exhibited a second order polarization susceptibility, $\chi^{(2)}$, of $8.93 \times 10^{-8}$ esu.

To determine the relative resistances of the poled polymeric film and the transmission enhancement layer a second device was constructed identical to that described above, but with the transmission enhancement layer omitted. With the transmission enhancement layer absent a potential of 170 volts applied to the ITO and gold produced a current of 25 nanoamperes. With the transmission enhancement layer present a potential of 400 volts was required to produce this same current. From these measurements the resistance of the transmission enhancement layer was calculated to be 1.35 times that of the poled polymeric film.

When employed as a waveguide, the device can be expected to exhibit low levels of light loss of less than 5 dB/cm. Without the transmission enhancement layer the corresponding device would exhibit light losses increased by 2 to 3 orders of magnitude.

EXAMPLE 2

Example 1 was repeated, but with TEL-22 substituted for TEL-11. The transmission enhancement layer and the poled polymeric film were observed to remain defect free following thermal cycling to simulate conditions that would be encountered in use of the optical device.

EXAMPLES 3 and 4

Figure 3:
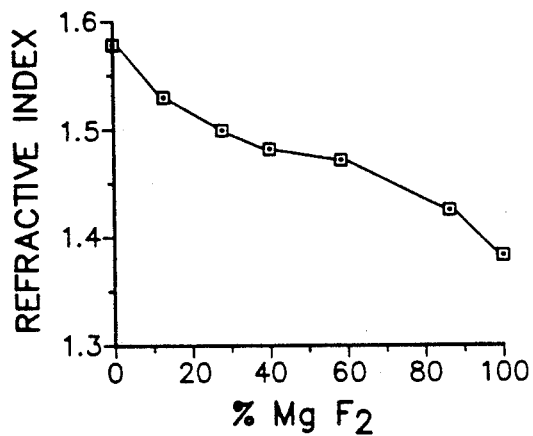
FIGS. 3 and 4 are plots of refractive index as an ordinate against percent by weight magnesium fluoride as an abscissa.
Figure 4:
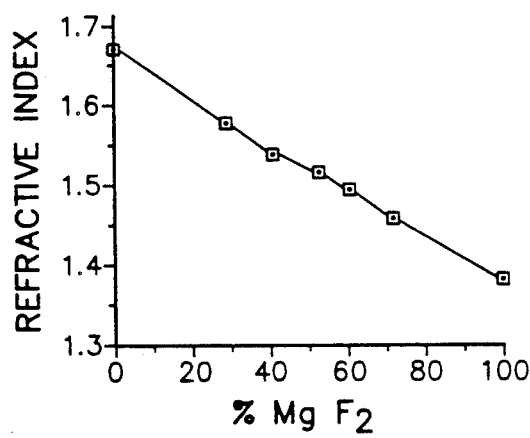

Using deposition procedures similar to those described above in Example 1 1000Å layers of each of TEL-11 and TEL-22 with varied proportions of magnesium flouride were prepared on silicon wafer substrates. Refractive indices were measured by ellipsometry at a wavelength of 632.8 nm. In FIG. 3 the refractive index of the transmission enhancement layer as a function of its magnesium fluoride content in weight percent is plotted where the aromatic low molecular weight compound codeposited was TEL-11. FIG. 4 is similar to FIG. 3, except that TEL-22 is substituted for TEL-11.

In each of FIGS. 3 and 4 it is apparent that the refractive index of the transmission enhancement layer can be varied significantly by varying the proportion of magnesium fluoride incorporated. Further, it is significant that each of the refractive index was well below that of the homopolymer of NOVM-60. This demonstrates the capability of forming a transmission enhancement layer according to the invention that exhibits a refractive index below that of the poled polymeric film, as is preferred for efficient propagation of electromagnetic radiation in the poled polymeric film.

The invention has been described in detail with particular reference to preferred embodiments thereof, but it will be understood that variations and modifications can be effected within the spirit and scope of the invention.

What is claimed is:

1. An optical article for the propagation of electromagnetic radiation comprised of
    an electrically conductive support,
    a poled polymeric film located on said support exhibiting a glass transition temperature of at least 50° C. and a second order polarization susceptibility greater than $10^{-9}$ electrostatic units, and
    a transmission enhancement layer interposed between said conductive support and said polymeric film, characterized in that
        said transmission enhancement layer is an amorphous layer of at least 0.5 μm in thickness having a refractive index less than that of said polymeric film and a resistance less than 10 times that of said polymeric film, said transmission enhancement layer being comprised of a mixture of (a) at least one metal oxide or fluoride and (b) a low molecular weight aromatic compound.

2. An optical article according to claim 1 further characterized in that said polymeric film exhibits a glass transition temperature of at least 80° C.

3. An optical article according to claim 1 further characterized in that said transmission enhancement layer exhibits a thickness in the range of from 1 to 10 μm.

4. An optical article according to claim 3 further characterized in that said transmission enhancement layer exhibits a thickness in the range of from 1 to 5 μm.

5. An optical article according to claim 1 further characterized in that (a) and (b) are present in weight ratio of from 20:80 to 90:10.

6. An optical article according to claim 5 further characterized in that (a) and (b) are present in a weight ratio of from 50:50 to 80:20.

7. An optical device according to claim 1 further characterized in that said aromatic compound is a phenylindan compound of the structure:

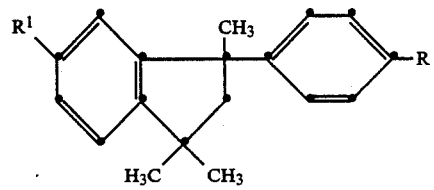

wherein R and $R^1$ are independently selected from the group consisting of nitro, amino, carboxyl, formamido groups, carbamoyl groups and heterocyclic groups derived from amino or carboxyl groups.

8. An optical device according to claim 1, further characterized in that said aromatic compound is a phthalimide compound of the structure:

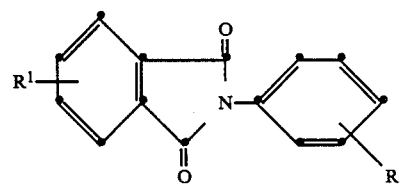

wherein R and $R^1$ are independently selected from the group consisting of nitro, amino, carboxyl, formamido groups, carbamoyl groups and heterocyclic groups derived from amino or carboxyl groups.

9. An optical article according to claim 1 further characterized in that said transmission enhancement layer is comprised of a metal oxide.

10. An optical article according to claim 9 further characterized in that said metal oxide is chosen from the group consisting of rare earth oxides, alkaline earth oxides, alumina, and silica.

11. An optical article according to claim 1 further characterized in that said transmission enhancement layer is comprised of a metal fluoride.

12. An optical article according to claim 11 further characterized in that said metal fluoride is chosen from the group consisting of alkali metal fluorides, alkaline earth fluorides and rare earth fluorides.

13. An optical article according to claim 11 further characterized in that said metal fluoride is an alkali metal fluoride.

14. An optical article according to claim 13 further characterized in that said alkali metal fluoride is lithium fluoride.

15. An optical article according to claim 11 further characterized in that said metal fluoride is an alkaline earth fluoride.

16. An optical article according to claim 15 further characterized in that said alkaline earth fluoride is magnesium fluoride.

* * * * *